United States Patent
Bradley (10) Patent No.: US 6,665,780 B1
(45) Date of Patent: Dec. 16, 2003

(54) N-WAY DATA MIRRORING SYSTEMS AND METHODS FOR USING THE SAME

(75) Inventor: Mark W. Bradley, Boulder, CO (US)

(73) Assignee: Radiant Data Corporation, Niwot, CO (US)

( * ) Notice: Subject to any disclaimer, the term of this patent is extended or adjusted under 35 U.S.C. 154(b) by 269 days.

(21) Appl. No.: 09/684,807

(22) Filed: Oct. 6, 2000

(51) Int. Cl.$^7$ ............................................... G06F 12/16
(52) U.S. Cl. ........................ 711/162; 711/112; 711/156
(58) Field of Search ........................... 711/4, 112, 114, 711/156, 161, 162; 707/200–204

(56) References Cited

U.S. PATENT DOCUMENTS

| | | | |
|---|---|---|---|
| 5,842,216 A | * 11/1998 | Anderson et al. | ............ 707/203 |
| 6,282,610 B1 | * 8/2001 | Bergsten | ..................... 711/114 |
| 6,389,423 B1 | * 5/2002 | Sakakura | ..................... 707/10 |
| 6,424,966 B1 | * 7/2002 | Meyerzon et al. | ............. 707/3 |
| 2001/0052058 A1 | * 12/2001 | Ohran | ........................ 711/161 |

* cited by examiner

Primary Examiner—Matthew Kim
Assistant Examiner—Woo H. Choi
(74) Attorney, Agent, or Firm—Martine & Penilla, LLP (57) ABSTRACT

Methods for N-way mirroring of data to a plurality of distributed storage and systems for carrying out the methods are provided. One method includes initially selecting an initiator storage. The initiator storage is configured to have data that is to be protected. The method also includes selecting a group of storage. Each storage in the group of storage is configured to obtain an initial copy of the data of the initiator storage that is to be protected. A modification in the data that is to be protected in the initiator storage is then detected. The method accordingly proceeds to notify each of the storage of the group of storage regarding the modification. A detection of the notification is configured to cause each of the storage of the group of storage to independently copy the modification so as to maintain data consistency between the initiator storage and each storage of the group of storage.

12 Claims, 11 Drawing Sheets

| ACTION | REQUIRED BIT SETTING |
|---|---|
| List | No bit changes |
| Open Shared | Set S bit |
| Open Exclusive | Set E bit to all, including the copy in use |
| Write | Set M to written copy, set I in all other copies |
| Change Attributes | Set A and M to changed copy, set A and I in all other copies |
| Close | Reset any Set consistency bits |

N-WAY DATA MIRRORING SYSTEMS AND METHODS FOR USING THE SAME

BACKGROUND OF THE INVENTION

1. Field of the Invention

This invention relates generally to data protection, and more particularly to methods for protecting data of local storage using distributed storage mirroring techniques.

2. Description of the Related Art

Users of computers are continually placing more and more reliance on their computers to create, edit, modify and store important documents. With this reliance, however, comes the unfortunate reality that computers and storage associated with computers fail. There are several techniques for handing such errors. In terms of storage, for example, people are advised to make backup copies of important data. Although backups work to protect certain data that has not been updated since the last backup, simple backups don't really work for users handling important data that continually changes from day-to-day, hour-to-hour, or even minute-to-minute.

For this reason, higher performance backup techniques which implement a redundant array of inexpensive disks (RAID) have become more common place for server environments and in desktop systems performing critical processing and storage. As is well known, there are several implementations of RAID (e.g., different RAID levels). In brief, RAID provides techniques for storing the same data across multiple locations, such as multiple hard disks. By storing the same data on multiple hard disks, the mean time to data loss (MTDL) and fault-tolerance also increases. In operation, a system using RAID presents the multiple hard disks that make up the array as a single logical hard disk. RAID level 1, which is commonly referred to as "disk mirroring," uses at least two disks, which may be logical or physical disks, each configured to store the identical data.

Figure 1:
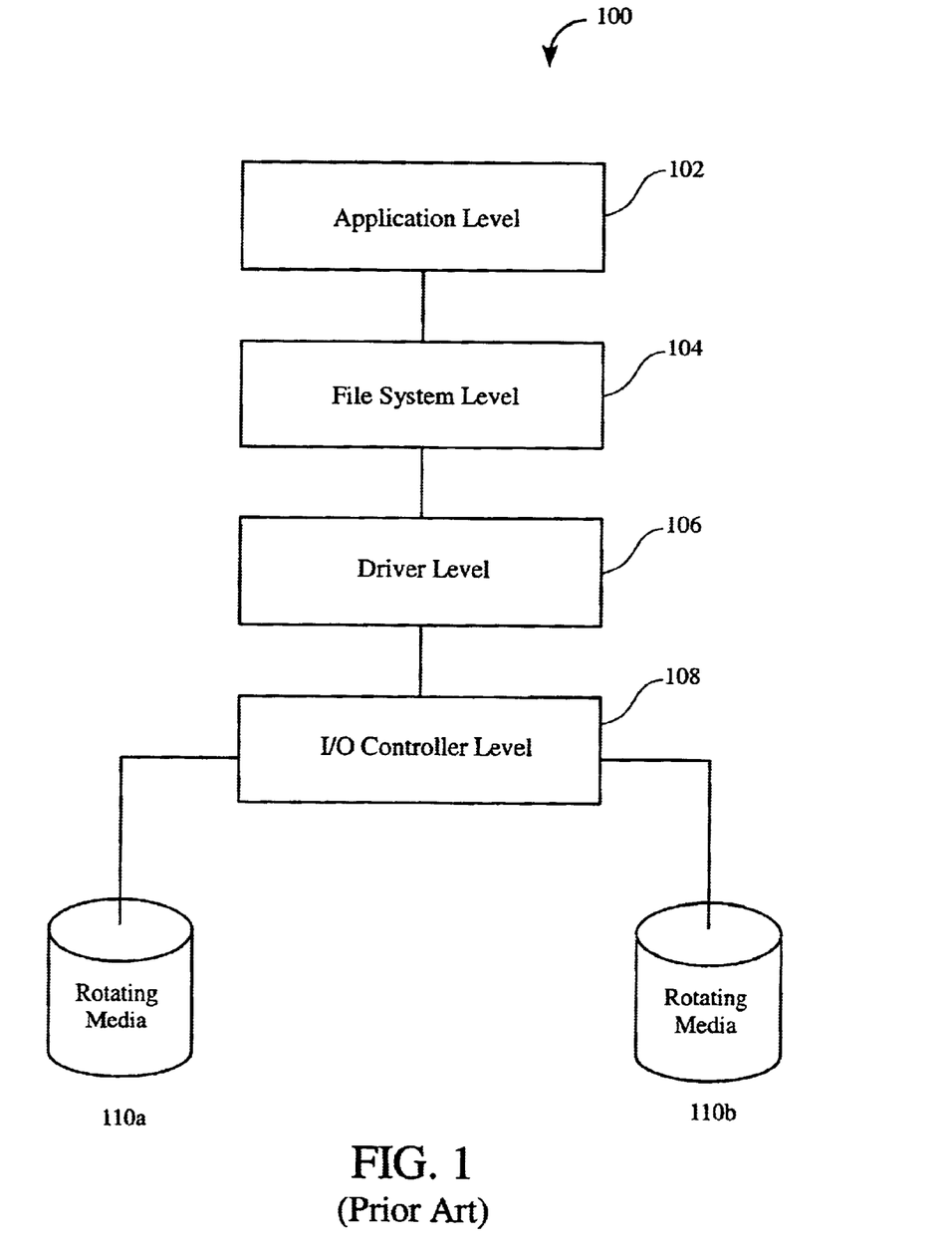
FIG. 1 is a prior art system that implements RAID level 1 mirroring.

FIG. 1 illustrates an example in which RAID level 1 is used to accomplish "mirroring." The system 100 includes an application level 102, a file system level 1 104, a driver level 106, an input/output controller level 108 (which may implement, for example, a SCSI controller), and rotating media 110. In the example, when a "write" I/O command is issued, a single write I/O can be split into two separate "write" I/O commands directed for storage at each of the rotating media 110a and 110b at different levels (depending on the system design), starting at the application level 102, or the file system level 104, or the driver level 106, or even at the input/output controller level 108. No matter what level the mirroring begins, the data needs to be written to the same particular locations in each of rotating media 110a and 110b.

Once written, each rotating media logic will have to provide the appropriate acknowledgement back to the level at which the mirroring is initiated. For instance, if the mirroring was initiated at the driver level 106, the driver level 106 will require appropriate acknowledgement from each media 110 before the acknowledgement is sent up to the file system level 104 and application level 102 as a single "write" acknowledge. It should be pointed out, however, that since the acknowledgement is generated independently by each rotating media's logic after the successful write, the there are circumstances in which the acknowledgement from one media 110 is received before that of another media 110. As a result, latencies are introduced and the latency is generally as long as the slowest media 110. These latencies can be even greater in cases where more than two rotating media 110 are implemented in a RAID level 1 mirroring arrangement.

In view of the foregoing, there is a need for data protection methods that are more efficient that traditional RAID 1 mirroring implementations and provide for improved fault tolerance and redundancy.

SUMMARY OF THE INVENTION

Broadly speaking, the present invention fills the aforementioned needs by providing methods for efficiently mirroring data to a plurality of storage nodes. It should be appreciated that the present invention can be implemented in numerous ways, including as a process, an apparatus, a system, a device, a method, or a computer readable media. Several embodiments of the present invention are described below.

In one embodiment, a method for N-way mirroring of data is disclosed. The method includes selecting an initiator storage. The initiator storage is configured to have data that is to be protected. The method also includes selecting a group of storage nodes. Each storage node in the group of storage is configured to obtain an initial copy of the data of the initiator storage that is to be protected. A modification in the data that is to be protected in the initiator storage is then detected. The method then proceeds to notifying each of the storage of the group of storage regarding the modification. The notifying is configured to cause each of the storage of the group of storage to independently obtain the modification so as to maintain data consistency between the initiator storage and the group of storage.

An N-way mirroring system is disclosed. The system includes: (a) an initiator storage, the initiator storage having data that is to be protected; (b) initiator logic, the initiator logic being configured to monitor changes to the data that is to be protected and to generate notifications of the changes; (c) a group of storage, at least some of the storage of the group of storage residing at different physical locations, yet each of the group of storage having a communication nexus to the initiator storage; and (d) a group of storage logic, each storage logic being associated with each storage of the group of storage. Each storage logic is configured to receive notifications of changes from the initiator logic and in response to certain notifications, initiate a pulling of the changes made at the initiator storage. The pulling of the changes is configured to be made independently by each of the storage logic of each storage of the group of storage and without assistance of the initiator logic.

In yet another embodiment, a method for consistently mirroring a plurality of storage devices having instances of a file is disclosed. Consistency is maintained for the plurality of storage devices using a file consistency protocol. The method includes changing a first instance of the file on a first storage device. Once the first instance of the file is changed, a bit of a set of file consistency bits for a second instance of the file on a second storage device is set. Each storage logic is configured to receive notifications of changes from the initiator logic and the updated information is sent (pushed) to the plurality of mirrored devices.

In yet another embodiment, a method for consistently mirroring a plurality of storage devices having instances of a file is disclosed. Consistency is maintained for the plurality of storage devices using a file consistency protocol. The method includes changing a first instance of the file on a first storage device. Once the first instance of the file is changed, a bit of a set of file consistency bits for a second instance of the file on a second storage device is set. The second instance of the file is then updated in accordance with the file consistency protocol such that the second instance of the file contains the change made to the first instance of the file.

In a further embodiment of the present invention, a consistently mirrored storage system is disclosed. The consistently mirrored storage system comprises a plurality of storage devices located within the consistently mirrored storage system and a plurality of instances of a file stored on the plurality of the storage devices. In addition, the consistently mirrored storage system includes a file consistency protocol executing on the plurality of the instances of the file. The file consistency protocol facilitates the modification of a first instance of the file and the updating of secondary instances of the file in accordance with the file consistency protocol such that the plurality of the storage devices are consistently mirrored.

The advantages of the present invention are numerous. Most notably, the present invention allows for a greater amount of storage devices to be used in a mirroring environment and the present invention avoids the latency problems associated with conventional mirroring solutions which require synchronous communication with each storage of a mirror group. Another advantage of the embodiments described herein is that each storage instance of a group can be located virtually anywhere, so long as some communication nexus can be established. If any one of the storage of the group were to be destroyed or damaged, for example, by simple failure, in a fire, a hurricane, an earthquake, etc., the data would still be protected by any one of the other members of the group. This provides a powerful redundancy too for important mission critical data, yet without introducing latencies associated with conventional data mirroring techniques.

Stated yet another way, a benefit of the methodologies described herein is that an application does not need to be synchronous with all mirror updates, but rather only with a single copy's execution. It is no longer always the responsibility of a RAID control logic to "push" data to other mirror copy locations, but rather it may be the responsibility of the other mirror copy locations to update themselves through a read or "pull" operation to the latest 'good' copy of the data. In any case, the mirroring of the information is autonomously executed with respect to the initiator of the write operation so as to reduce the apparent latency of the mirroring operation. Implicit in this methodology, too, is that file objects rather than blocks are maintained consistent with one another. This provides further efficiencies in the types and sizes of the chunks of data that are written or copied.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 3A-1 and 3A-2 provide exemplary actions and bits associated with a data consistency protocol, in accordance with one embodiment of the present invention.

DETAILED DESCRIPTION OF THE PREFERRED EMBODIMENTS

Inventions for protecting data using an N-way mirroring system and methods for accomplishing the same are disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the present invention relates to the mirroring of data resident on storage devices to ensure the protection of an initiator drive or data resident at the initiator drive. In exemplary embodiments, one or more drives are selected to be mirroring devices which will maintain updates of changes made to data resident at the storage associated with the initiator. The mirroring devices can, in a preferred embodiment, be resident at any location. The locations are preferably selected so as to protect the data at the storage of the initiator from harm, such as fire, earthquakes, floods, theft and the like. Therefore, the mirrored drives can provide more than simple fault tolerance, but also can provide protection from unrecoverable physical events. The data to be mirrored, is preferably kept consistent using a consistency protocol that ensures the all instances of files or data are updated.

For more information on the consistency protocols described herein, reference can be made to co-pending and commonly assigned U.S. Patent Application entitled "FILE CONSISTENCY PROTOCOLS AND METHODS FOR CARRYING OUT THE SAME," having U.S. application Ser. No. 09/662,368, filed on Sep. 13, 2000. This application is herein incorporated by reference.

Figure 2A:
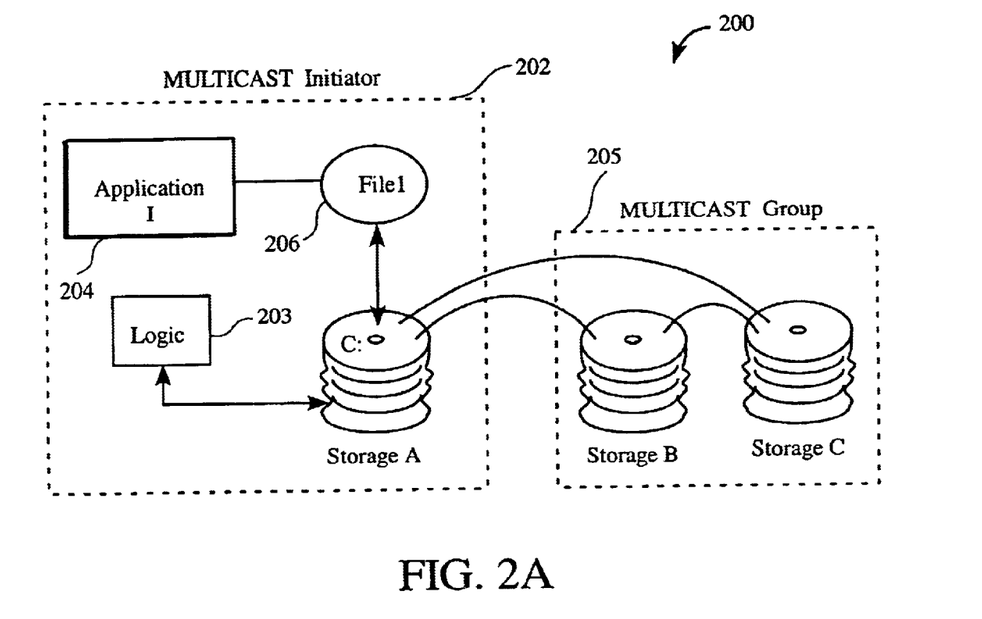
FIG. 2A shows a diagram of an N-way mirroring data protection system, in accordance with one embodiment of the present invention.

FIG. 2A shows a diagram 200 of an N-way mirroring data protection system in accordance with one embodiment of the present invention. As used herein, "N-way" means that the mirroring can occur to "N" number of mirrored drives. In one embodiment, "N" can have a theoretical upper limit of $2^{112}$ (e.g., decimal 5,192,296,853,482,768,530,496,329,220,100). In essence, the protection and flexibility of this mirroring is much more powerful than RAID, which requires a host processor and system to access multiple local drives and control simultaneous communication therewith.

The N-way mirroring system 200 includes a multicast initiator 202 and a multicast group 205. Broadly speaking, the term "multicast" is used herein to denote communication to and from and between one and multiple storage instances. With this in mind, the multicast initiator 202 includes, in this example, an application I 204 which can access data (e.g., a file 206) from a storage A (e.g., initiator storage). Additionally, the data accessed by the application I 204 from the storage A can be of any type, such as a file, a directory entry, a directory of files, physical volumes, logical volumes, etc. Accordingly, storage A can either be a physical drive or can be a logical drive which is made up of a plurality of parts of other physical drives (e.g., hard disk drives and the like).

Figure 2B:
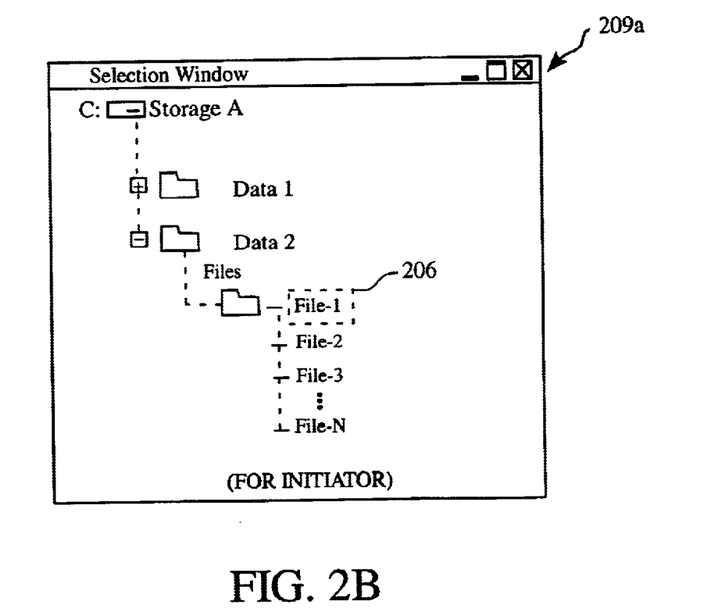
FIGS. 2B–2E illustrate exemplary graphical user interfaces that may be used set up, control and/or operate the N-way mirroring data protection system, in accordance with one embodiment of the present invention.
Figure 2C:
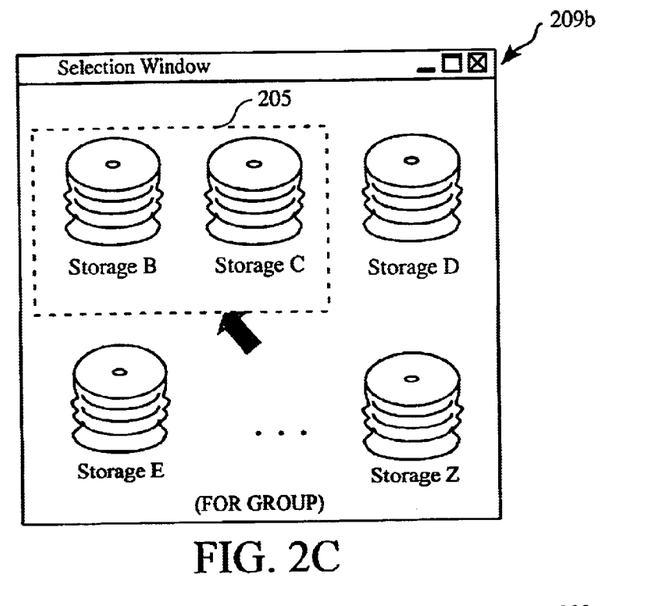

In one embodiment, a user will set up a multicast initiator 202. The setup will generally include the identification of certain data from storage A, which the user desires to have N-way mirroring protection. For instance, the user can go to a selection window 209a shown in FIG. 2B, and traverse through a tree to select certain files, such as file-1, to be protected by the N-way mirroring system of FIG. 2A. In another embodiment, the user can simply select an entire folder, or an entire drive (e.g., drive C:) to be protected by N-way mirroring. Once the particular data to be protected has been selected using the selection window 209a of FIG. 2B, the user will have to identify using a selection window 209b of FIG. 2C, the particular storage that will be part of the multicast group 205. Although graphical user interface (GUI) selection mechanisms are shown herein, it should be understood that any other selection technique may also work, such as text based selection, pointer selection, touch screen selection, etc.

In the example of FIG. 2A, the multicast group 205 includes storage B and storage C. Therefore, in FIG. 2C, the user may select storage B and storage C to be part of the multicast group 205. Of course, the user could have selected any other storage for which the user has access by way of any type of communication nexus (e.g., a network). As used herein, a network connection shall broadly include any type of network or transport such as a bus, a local area network (LAN), a wide area network (WAN), a local storage network, a distributed storage network, a storage area network (SAN), intranets, as well as the Internet.

Figure 2D:
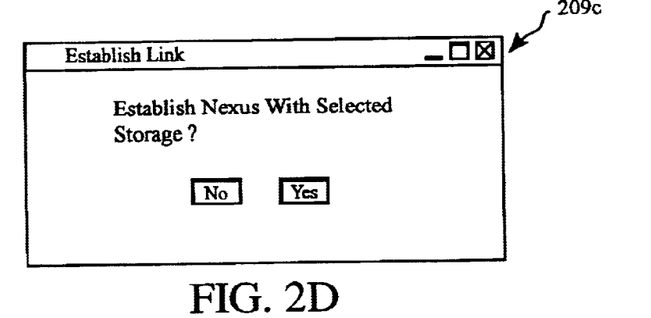

Upon selecting the particular storage to be part of the multicast group 205, the user may have to establish a link using window 209c of FIG. 2D. For instance, if the storage selected to be part of the multicast group 205 is at a remote location or requires specific access addressing or codes to establish the nexus, the user can establish a nexus to the selected storage using handles, keys, passwords and the like. Accordingly, once the multicast group has been defined and appropriate links have been established between the storage A and all of the desired storage of the multicast group 205, the N-way mirroring system 200 of FIG. 2A will have to be initialized to create the initial mirrored copies of the data to be protected (e.g., from storage A of FIG. 2A).

Figure 2E:
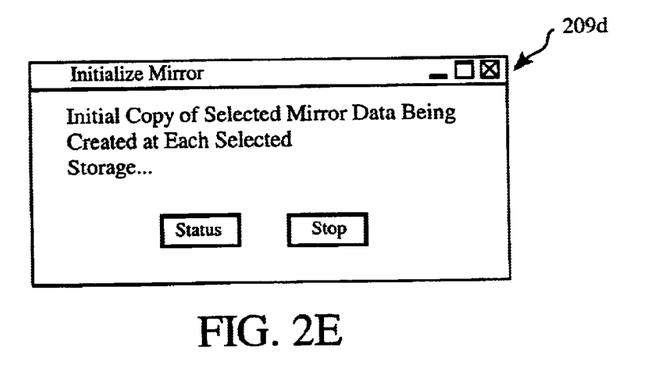

As shown in FIG. 2E, an initialized mirror window 209d may be shown indicating that an initial copy of selected mirror data will be created for each of the selected storage that is defined as part of the multicast group 205. The user may also obtain a status of the copy operation, if desired. This operation can also be done in the background so as to prevent user interruption. For example, the data selected using the selection window 209a of FIG. 2B will first be copied to each of the storage that is part of the multicast group 205. In this manner, at an initial state, the selected data from storage A will be identically mirrored to each of the storage that forms part of the multicast group 205. Once the system has been set up and is in operating order, a user accessing data from storage A that is part of the protected data, can access the data using any type of data handling or rendering software, hardware, firmware or application such as application I 204. For instance, the user of application I can gain access to file 1 206 that is resident in storage A. If the user modifies any of the data of file 1 using application I, that modification will be initially made to the data in storage A. In order to maintain consistency of file 1 at each storage that defines the multicast group 205, logic 203 that is part of the multicast initiator 202 will have to notify each storage of the multicast group of the change or modification.

Figure 3A:
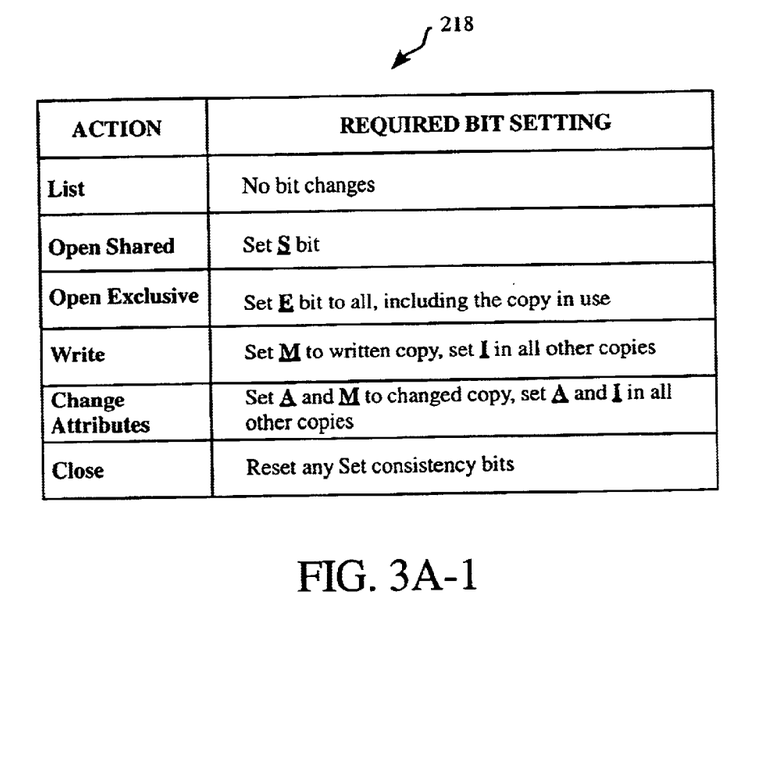
Figure 3A:
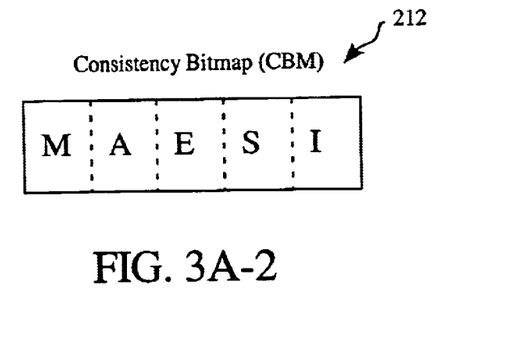

As shown in FIG. 3A-1, the various actions that can be performed to a file or data can be a "list" operation, an "open shared" operation, an "open exclusive" operation, a "write" operation, a "change attributes" operation, and a "close" operation. Changes to files or data are preferably managed using one or more consistency bits that form part of a consistency bitmap (CBM) 212 shown in FIG. 3A-2. The bits of the consistency bitmap 212 therefore enable the management of the different operations that can be performed upon a file or data, and enable the maintenance of consistency among instances of the same file or data (e.g., stored at the mirrored drives). In a preferred embodiment, a file consistency protocol implements the bits of the consistency bitmap (CBM) 212. In one embodiment, the bits include "M", "A", "E", "S" and "I" bits. The "M" (i.e., modify), "A" (i.e., attribute), "E" (i.e., exclusive), "S" (i.e., share) and "I" (i.e., invalid) bits define different modes and different actions which may be performed or may need to be performed to maintain consistency between data associated with the multicast initiator 202 and instances of the data resident in storage of the multicast group 205.

Each of the actions of FIG. 3A-1 will now be described in greater detail below.

List Action

Among the actions that may be performed on the copies of the file is a "List" action, as shown on table 218. When a user desires to list (e.g. using ls or lf or a comparable function) properties of a file (i.e., file size, access permissions, owner, etc.), a change is not made to a file. Thus, the "M", "A", "E", "S" and "I" bits remain unchanged. This is because the attributes of a file may be read without performing an open of the file itself.

Oven Shared Action

Another action a user may perform on the file is an "Open Shared" to place the file in an open, shared mode. This is especially common practice if a file is to only be read. In the open shared mode, a user opens a file, and other users are able to simultaneously open copies of the file. In this instance, the "S" bit is (which represents the shared mode) set on the file accessed by the user and all other copies of that file. No changes to other copies of this file are required. When the user closes the file, the "S" bit in the file and the multiple copies is reset. Although, if other instances were open in the open shared mode, the "S" bit will remain set until all instances having the "S" bit set are closed.

Olsen Exclusive Action

When a user desires to execute an "Open Exclusive" action to set an open exclusive mode, the "E" bit is set on all copies including the one desiring to set the open exclusive mode. Initially, a determination is made to ascertain whether any one of the "M", "A", "E", "S" and "I" bits is set on another instance of the file. That is, if any instance has one of the consistency bits set to "1" (i.e., true), then the user desiring to set the open exclusive mode will fail. However, if no other instances have one or more of their consistency bits set to "1", then the user will be able to open the file in the open exclusive mode. When the "E" bit is set, all instances of the file will fail an "open," except for the one that set the "E" bit. Furthermore, any attempts to open the file by other consumers (e.g., users on a computing device) will also fail, which includes preventing all others from making independent copies of the file. The only operation that may be performed on a file that has its "E" bit set to "1" is a LIST of that file. The list operation allows only file attributes to be read. It must be noted, however, that the information obtained from the list operation may later be invalid, as it is possible to exclusively open a file and for the user or application performing the exclusive open to alter the attributes of the file thus making one or more of its attributes invalid (e.g. to render an executable file non-executable). Upon the close of the file the having its "E" bit set, that "E" bit shall be reset to zero "0." In addition, the initiating file will also have its "M" bit set to 1 (if it was written) and all copies/instances of that file will have their "I" bit set to "1" and shall be updated to match that of the copy which had its "E" bit set. When all updates have occurred, the "M" and all relevant "I" bits are reset to "0." During an open, if the attributes are changed, the protocol will call for the "A" and "I" bits to be set for all other instances, as will be described in greater detail below.

Write Action

When a user desires to write to a file or perform another modification on the file that is opened shared or opened exclusive, the user may execute a "write" action. The "M" bit is used when data in the file is modified in any manner. Thus, as data is written to the file, the "I" bit in copies of the file is set to indicate that the data contained in the copies is now invalid. This occurs since the data contained in the copies does not include the modifications made to the initiating file. Thus, all other copies must be updated to match the file with the "M" bit set. Once this has occurred, the "M" and "I" bits in all affected files must be set back to false (e.g., zero), indicating that consistency has been attained. In one embodiment, the data in the copies is updated by the application, file system, or operating system acting upon the copies "pulling" the modification from the modified file. In another embodiment, the copies are updated by "pushing" the modification(s) to any affected copies having the "I" bits. In still another embodiment, the pulling and pushing operations can be performed using a messaging technique in order to reduce communication overhead.

Chanie Attributes Action

A user may also change the attributes of a file with a "Change Attributes" action. Exemplary attributes can include name, owner information, access permissions, location of the file, the size of the file, time stamps, as well as other writable attribute parameters. As the user changes the attributes of the file, the "A" bit and the "M" bit is sent on the initiating file, and the "A" bit and the "I" bit is set on all other instances. This ensures that all other instances are made aware that the attributes are now invalid. As soon as other files are updated with the attribute changes, the "A" and "M" bits are reset on the initiating file, and the "A" and "I" bits are reset on all updated instances of the file. At that time, all other instances and the initiating file will have consistent attributes. In one embodiment, the instance copies are updated when the copies "pull" the attribute changes from the initiating file. In another embodiment, the instance copies are updated when the initiating file "pushes" the attribute changes to the instance copies.

Close Action

A "Close" action, which closes the file opened by the user, is also shown with respect to the table 218. When a user completes one of the aforementioned actions, the file in use can then be closed. In some cases, the "close" action may have an implicit "write" performed (or not). The close action is completed when all the bits that were set (e.g., the "S" bit in the open shared mode) are reset.

Figure 3B:
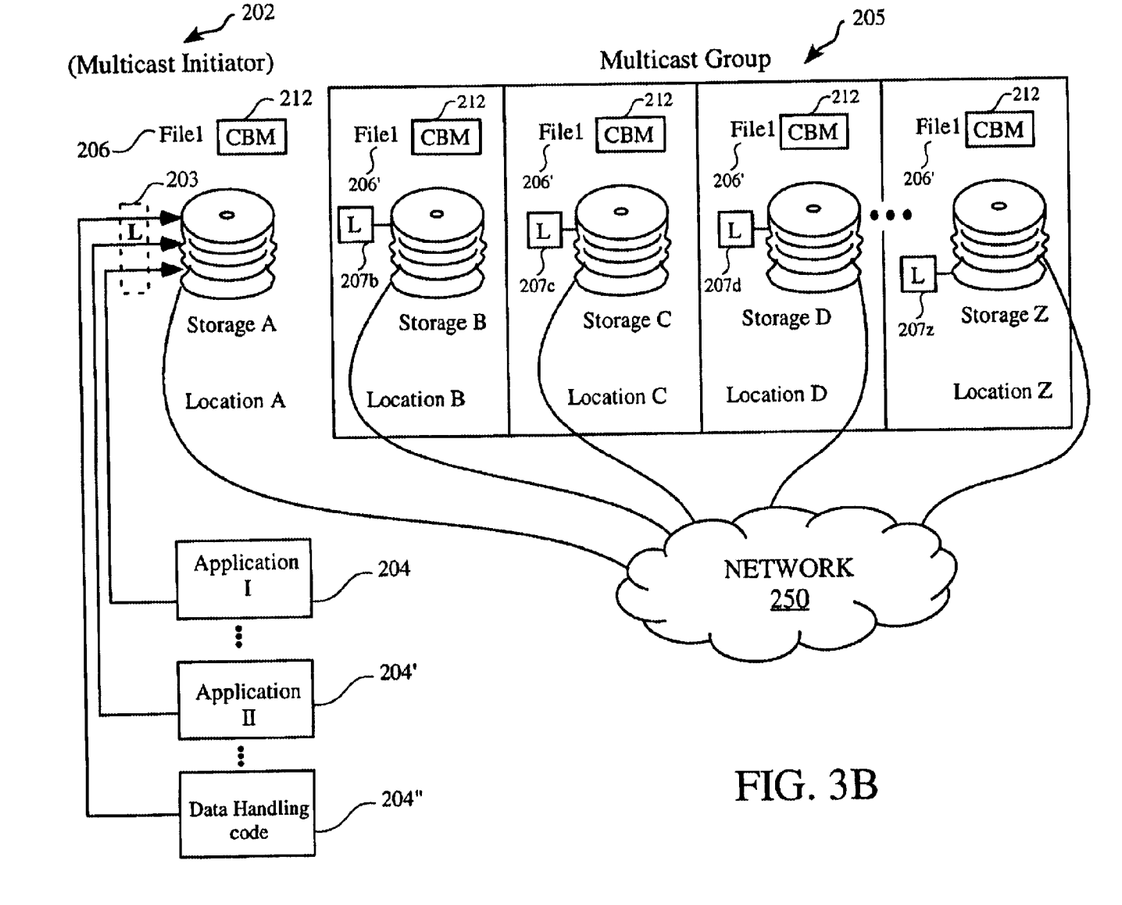
FIG. 3B illustrates a block diagram of storage A sitting at location A and in communication with each of the storage associated with the mirror group, in accordance with one embodiment of the present invention. In an exemplary implementation, for example in a network, the mirror group may be addressed using a multicast address. The term multicast group and mirror group are used synonymously herein.

FIG. 3B illustrates a block diagram of storage A sitting at location A in communication with each of the storage associated with the multicast group 205. As shown, storage A at location A is considered the multicast initiator 202, and the multicast initiator 202 is in communication by way of the network 250 with each of the storage of the multicast group 205 that may be distributed at different physical locations. The different physical locations may be as close as side-by-side in the same room, or distributed in different rooms, buildings, or locations throughout the world. In either case, each location can preferably establish a nexus (over any physical transport, e.g., Ethernet, Fibre Channel, FDDI, PCI, Infiniband or local bus) to the storage at other locations in the multicast group 205 so as to streamline the consistency protocol that ensures that data being accessed at the storage A remains consistent throughout each mirrored drive (i.e., such drives being associated with each location that defines the multicast group 205).

By way of example, different consumers such as application I 204, application II 204', or data handling code 204" can gain access to the storage A at location A and make changes to either data and attributes or attributes of certain files that are stored at location A. For ease of understanding, if application I 204 were to gain access to file 1 206 stored at location A, logic 203 associated with storage A will note the change to the file 1 stored at location A. The logic 203 will then initiate changes to the consistency bitmap 212 associated with storage A, as well as communicate state changes to the consistency bitmaps 212 of each storage of the multicast group 205. By way of example, if file 1 206 were modified, the M bit in the consistency bitmap 212 would be changed from false to true (e.g., from "0" to "1").

The consistency bitmaps 212 associated with each storage, such as storage B, storage C, storage D, and storage Z would also experience a change to the consistency bitmaps 212. In one embodiment, logic 207b, 207c, 207d, and 207z associated with each storage of the multicast group 205 will be charged with managing the consistency bitmaps 212 associated with each storage at each location. For instance, the "I" bit (invalid bit) would then be set to true for each storage location B through Z. Since the invalid bit is set to true at each consistency bitmap 212 of each location in the multicast group 205, the logic 207 of each location will then initiate appropriate actions to update instances of the file 1 206' resident at each storage of each location. For example, logic 207b associated with storage B would then initiate a copy of file 1 206 from storage A in order to update the instance of the file 1 206 at storage B. The update can be in the form of an entire copy of the file, or in the form of only copying those portions which differ between file 1 206 and the instance of the file 206'.

Once copied, the storage B at location B would then have a mirror image of the data (e.g., file 1) stored at storage A of location A. The storage C, storage D, and storage Z, would likewise perform the appropriate update to the file 1 206' using logic 207c, 207d, and 207z associated with location C, D, and Z. In one embodiment, the logic 207d associated with storage D can be configured to poll the logic of other storage that is part of the multicast group 205 in order to obtain an update to the file 1 from a location closer than that of storage A. For example, location B may be physically closer to location D and thus, storage D could make a copy of the updated file data from storage D instead of making a copy directly from storage A.

In such cases, the logic 207d would be intelligent enough to determine that storage B had the updated copy of the file 1 since the consistency bitmap 212 of storage B would indicate that the invalid bit was set back to false for the file 1 and the attributes would reflect a timestamp that matched the modification timestamp for that object. Thus, the storage D would simply make a copy of file 1 from storage B instead of making a copy from storage A, which may be less available due to its workload, being more remote or being connected through a slower link or nexus. The same situation could happen for other storage locations that are part of the multicast group 205. Accordingly, once a storage associated with the multicast group 205 has gained an update of the file from the storage A, the other storage members of the multicast group 205 can synchronize their data intelligently using the consistency bitmap information provided for each file that is in the storage associated with each member of the multicast group 205. It should also be noted that mirrors of mirrors may also be established such that a change to data in one mirror group may cascade into a second mirror group through the actions on a single node which is an intersect of two or more mirror groups as shown in FIG. 3D. For instance, a mirror of an initiator of Mirror Group I can also be an initiator of a Mirror Group 2, and so on. As such, the N-Way mirroring system of the present invention is expandable and flexible enough to be cascaded without introducing any additional overhead to any one of the initiators.

Thus, in accordance with one embodiment, the updating of the file data stored at storage A would be transparent to the logic 203 of location A. The logic 203 of location A need only inform the multicast group 205 that a change occurred. Once notified, each member of the multicast group using its own logic that is not controlled by storage A will intelligently pull and mirror back updated data from storage A to ensure that each storage location of the multicast group 205 has an exact copy of that of storage A.

Still further, the updating of the multicast group 205 can occur in real-time as changes are made to the data in storage A by any application, data handling code, logic, hardware, firmware, or any other consumer that can gain access to the data stored in storage A, make changes or view data stored in storage A. In another embodiment, the mirroring of the data of storage A can occur on a schedule. Such scheduling can be preset by a user during initialization and will thus occur without further intervention by the user.

Figure 3C:
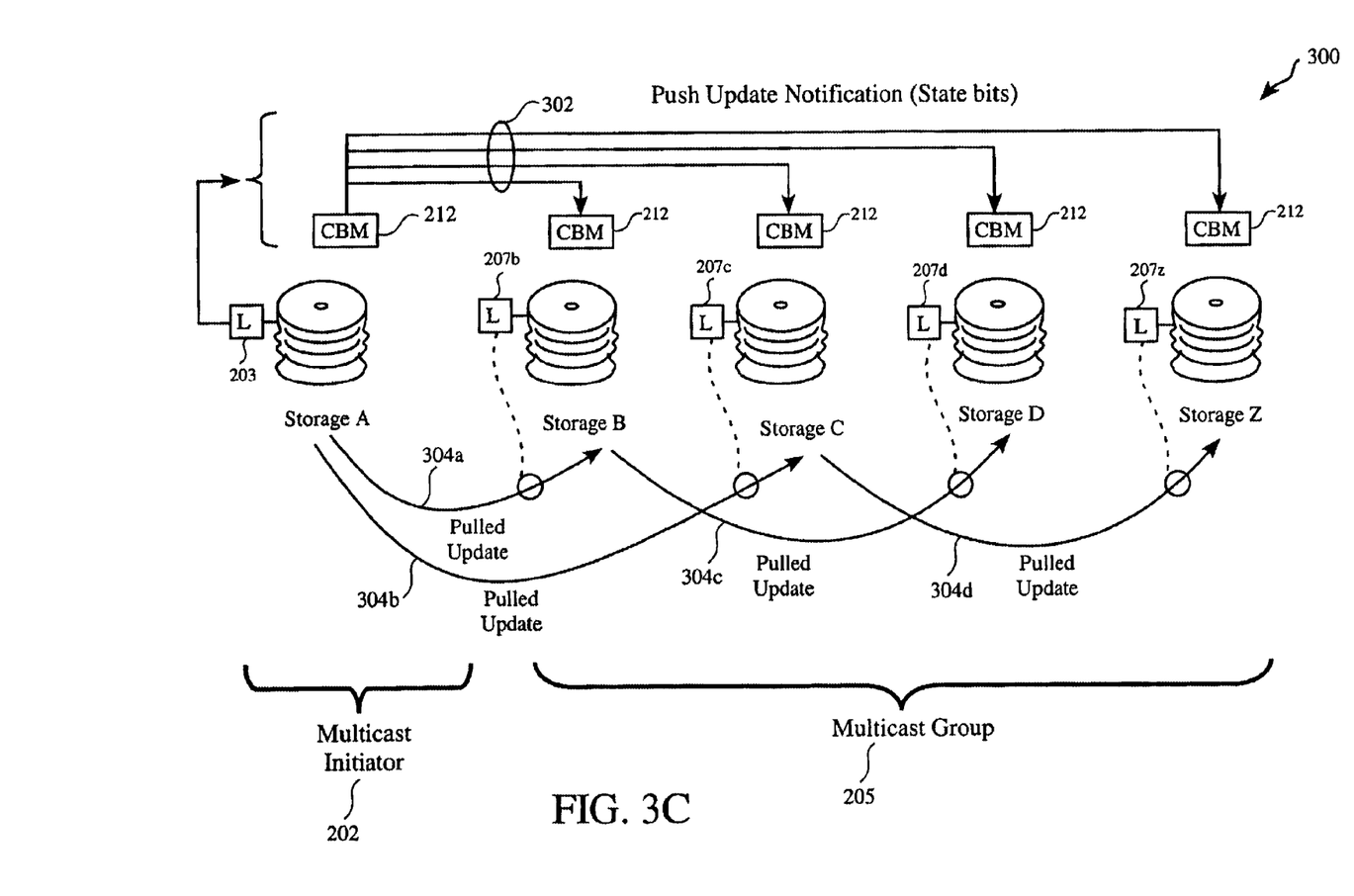
FIG. 3C shows a block diagram of storage associated with a multicast initiator and a multicast group, in accordance with one embodiment of the present invention.
Figure 3D:
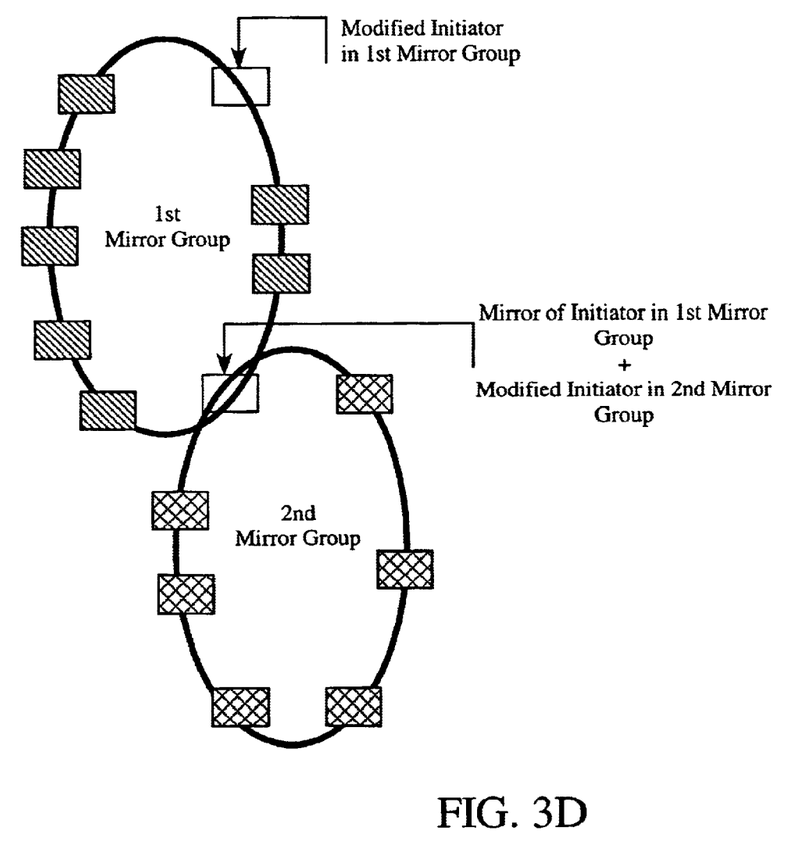
FIG. 3D shows an embodiment in which a member of one mirror group can also be an initiator of another mirror group, thus defining a scalability of the N-way mirroring system.

FIG. 3C shows a block diagram 300 of the storage associated with the multicast initiator 202 and the multicast group 205. In this example, the logic 203 associated with storage A of the multicast initiator 202 will command the push of the update notification 302 to each of the storage associated with the multicast group 205. As mentioned above, the update notification essentially provides state bits to the consistency bitmaps 212 associated with the data (e.g., sectors or files) that has been changed or modified at the storage A, which is the multicast initiator 202. Once the state bits have been updated at each storage location, the logic 207b, 207c, 207d, and 207z associated with each storage of the multicast group 205 will intelligently command the pulling of the updated data in order to maintain a consistent copy of the storage A.

As mentioned above, based on the settings of the consistency bitmaps 212 associated with the data or file that has been changed or modified at storage A, logic 207 associated with each storage of the multicast group will determine a best location from which to pull the update of the data that has changed at storage A. In this example, logic 207b of storage B obtained the update directly from storage A as shown by communication link 304a. Logic 207c of storage C also obtained the update directly from storage A as shown by communication link 304b. However, in one example, storage D may be closer to storage B or may have a faster connection to storage B than to storage A. If the logic 207d associated with storage D determines that storage B has the update, storage D could pull the update directly from storage B instead of pulling it from storage A. This is shown by communication link 304c. In a like manner, logic 207z of storage Z could obtain the update directly from a member of the multicast group 205.

This is shown by having storage Z obtain the update directly from storage C as shown by communication link 304d.

Figure 4:
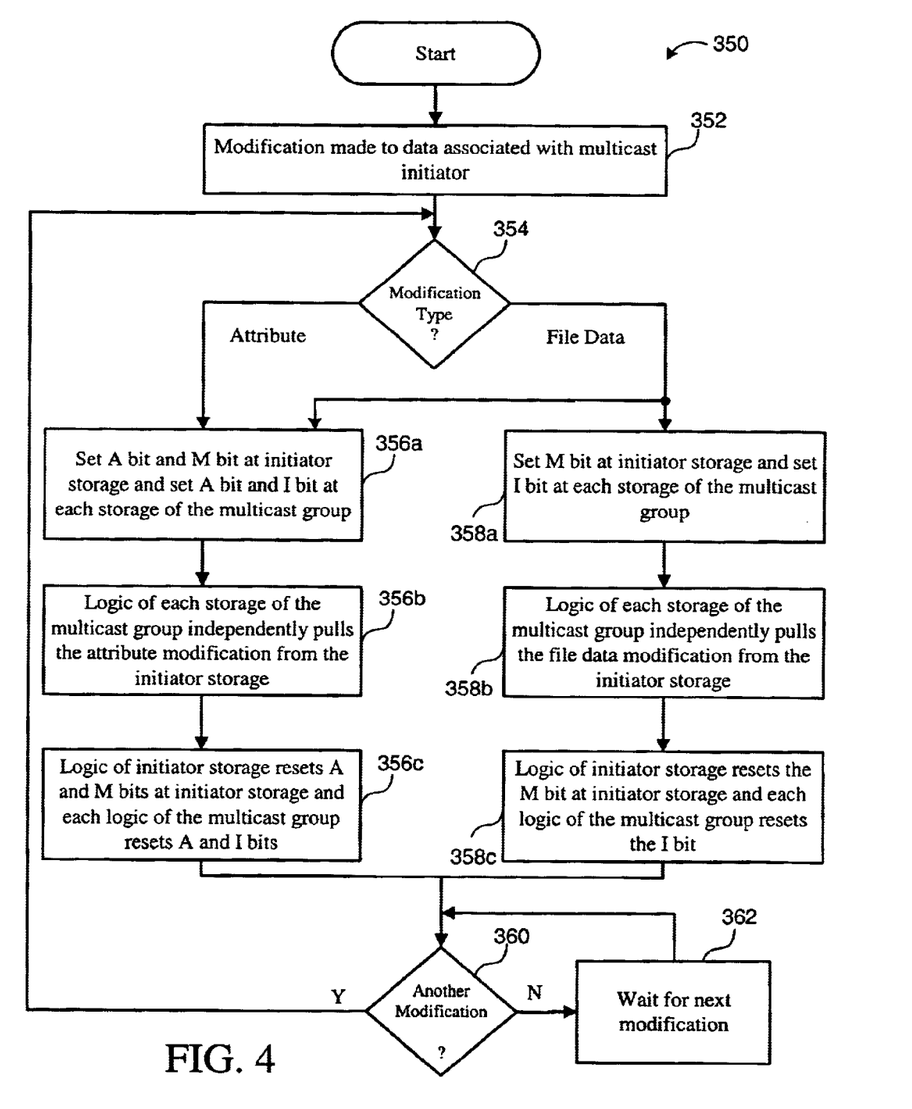
FIG. 4 illustrates a flowchart diagram of an exemplary process of maintaining consistent data between the multicast initiator and the data resident at each storage of the multicast group, in accordance with one embodiment of the present invention.

FIG. 4 illustrates a flowchart diagram 350 of an exemplary process of maintaining consistent data between the multicast initiator and the data resident at each storage of the multicast group. The method begins at an operation 352 where a modification is made to data associated with the multicast initiator. Once any modification has been made to data associated with the multicast initiator, and the data at the multicast initiator was selected to be protected as describe with reference to FIG. 2B, a determination is made at operation 354 as to the type of modification.

If the modification is only an attribute modification, the method moves to an operation 356a. In operation 356a, an A bit and an M bit is set at the initiator storage, and an A bit and an I bit is set at each storage of the multicast group. As mentioned above, the A, the M, and the I bits are each part of the consistency protocol bits that define states that are part of a consistency bitmap 212. The method then moves to operation 356b where logic associated with each storage of the multicast group independently pulls the attribute modification from the initiator storage. As mentioned above, the logic of each storage in the multicast group could also pull the attribute modification from a neighboring multicast group storage if that neighbor multicast group storage already obtained the update from the initiator storage.

Once the attribute modification is independently pulled by the logic of each of the storage associated with a multicast group in operation 356b, the method moves to an operation 356c where logic of the initiator storage will reset the A and the M bits at the initiator storage (e.g., from true "1" back to false "0"), and the logic of each of the multicast group storage will independently reset the A and the I bits when the update has occurred at the respective storage of the multicast group. The method then returns to operation 360 where it is determined if another modification has occurred. If none has occurred, the method moves to operation 362 where the N-way mirroring system will wait until a next modification occurs (or until a scheduled timer expires). Assuming that a modification to data has occurred, the method will proceed through operation 354. In one embodiment, because a change to data will necessarily also include changing some attribute (e.g., such as access time stamp or the like), the method would traverse through method operations 356a, 356b, 356c, 358a, 358b, and 358c substantially simultaneously. Except, however, the setting and resetting of the "I" bit through flows 356 and 358 would only occur once. As the flow through 356 has already been discussed, the flow through 358 will now be described in greater detail.

In operation 358a, the M bit is set at the initiator storage and the I bit is set at each storage of the multicast group. As mentioned above, the M bit indicates that a modification to the data associated with a file, for example, has occurred. The setting of the I bit at each storage of the multicast group informs the logic associated with each storage in the multicast group that the data for a particular file or sectors are now invalid and need to be updated. The method then moves to operation 358b where the logic of each storage of the multicast group will independently pull the file data modification from the initiator storage. This occurs as described above directly from the initiator storage or from neighboring storage associated with a multicast group. The method then moves to operation 358c where logic from the initiator storage will reset the M bit at the initiator storage and each logic of the multicast group will reset the I bit when the update has been saved to the respective storage of the multicast group. A this point, the N-way mirroring system will then wait until a next modification occurs to either data or attributes in operation 362.

Figure 5:
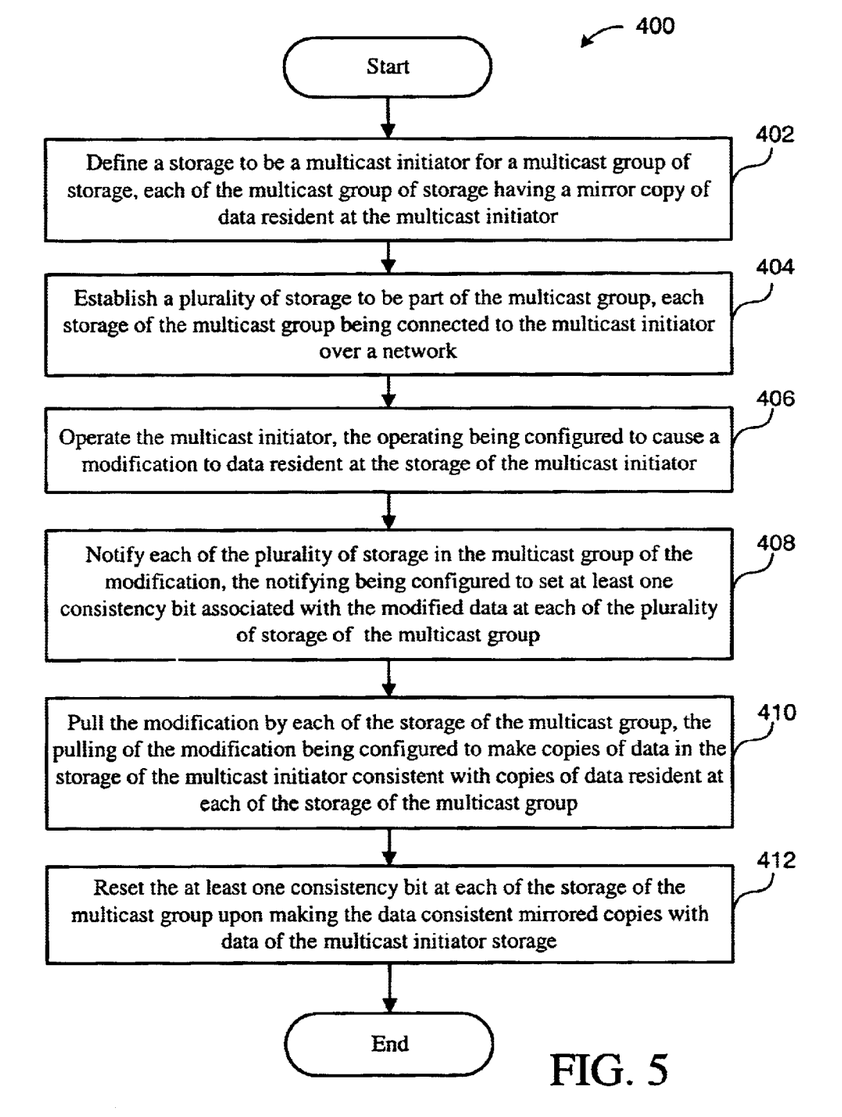
FIG. 5 illustrates a flowchart of exemplary functional operation of the N-way mirroring system, in accordance with one embodiment of the present invention.

FIG. 5 illustrates a flowchart 400 of exemplary functional operation of the N-way mirroring system, in accordance with one embodiment of the present invention. The method begins at an operation 402 where a storage to be a multicast initiator is defined for a multicast group of storage. Each storage that is part of the multicast group will have a mirror copy of data resident at the multicast initiator. As mentioned above, during initialization, a particular storage device is identified and initiated to be a multicast initiator and particular data or all of the data resident at the multicast initiator, will be part of the protected data that will be mirrored as copies to the storage of the multicast group.

The method then moves to operation 404 where a plurality of storage to be part of the multicast group is established. Each storage of the multicast group will be connected to the multicast initiator over a network connection. As stated above, a network connection broadly includes any type of interconnection that enables at least a processor and memory to communicate with another processor and memory over a communication link, a communication bus or other transport or fabric. Once the multicast group has been established, the method moves to operation 406 where the multicast initiator is placed into operation. During operation, a modification may be caused to the data resident at the storage of the multicast initiator. Once a modification has been determined to have occurred at the multicast initiator storage, the method moves to operation 408 where each of the plurality of storage in the multicast group is notified of the modification.

The notifying is configured to at least set one consistency bit (e.g., broadly speaking, any bit or code) that is associated with the modified data at each of the plurality of storage of the multicast group. Now that the storage of the multicast group has been notified of the modification, the modification can be pulled by or pushed to each of the storage of the multicast group. In one embodiment, the pulling of the modification is configured to make copies of data in the storage of the multicast initiator (or from a neighboring storage in the multicast group), to maintain the copies of the data resident at each storage of the multicast group consistent with that of the multicast initiator storage. Once the modification has been pulled in operation 410, the method moves to operation 412 where at least one consistency bit at each of the storage of the multicast group is reset upon making the data consistent mirrored copies with data of the multicast initiator storage.

Figure 6:
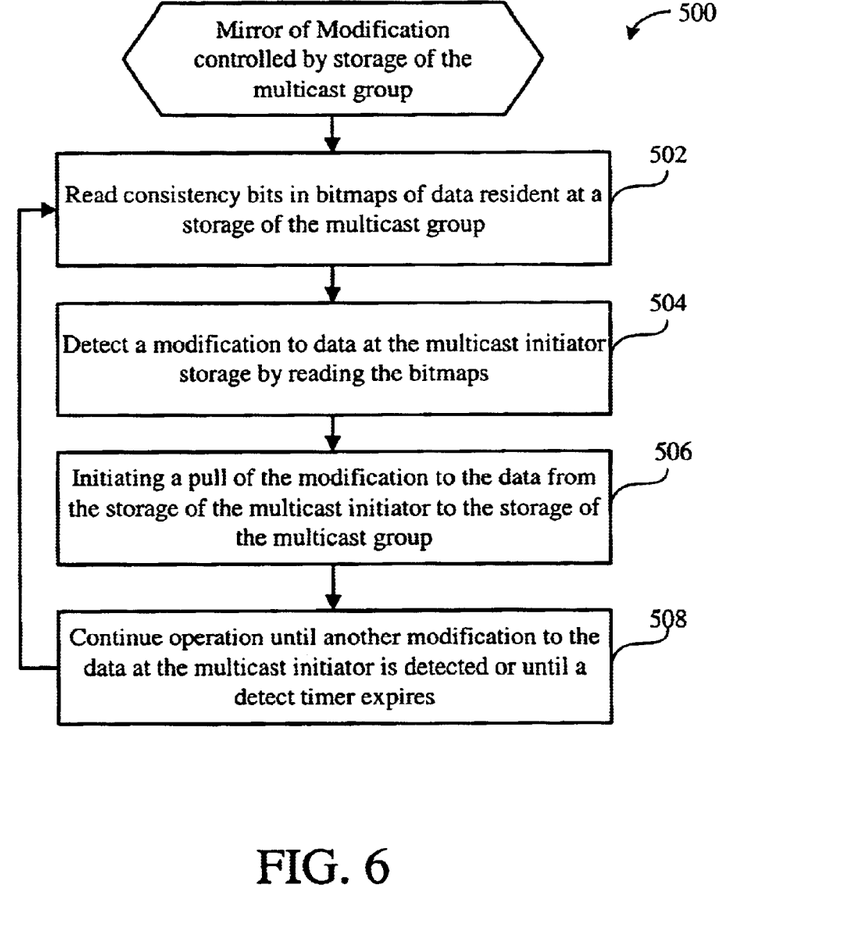
FIG. 6 illustrates a flowchart in which the mirroring of the modification is controlled by logic associated with the storage of the multicast group, in accordance with one embodiment of the present invention.

FIG. 6 illustrates a flowchart 500 in which the mirroring of the modification is controlled by logic associated with the storage of the multicast group. In this method, the logic at each of the storage in the multicast group will control the updating of the modified data in order to maintain a perfect mirrored copy of the data being protected at the multicast initiator storage. The exemplary method begins at an operation 502 where consistency bits in the bitmaps of data resident at a storage of the multicast group is read. As mentioned above, the data resident in storage of the multicast group will have associated therewith consistency bitmaps for each of the data stored at the particular storage.

When a modification occurs to a particular file or data of the multicast initiator storage, the consistency bits will be modified by the logic associated with the multicast initiator storage. This updating of the consistency bits at the consistency bitmaps will enable the reading of the consistency bits at the storage of the multicast group in operation 502. In operation 504, a modification to data at the multicast initiator storage can be detected by reading the bitmaps. For instance, the bitmap may have an I bit set to true, which means that the particular file or data stored at the multicast group storage is invalid.

Upon detecting the modification in operation 504, the method moves to operation 506 where a pull of the modification to the data is initiated from the storage of the multicast initiator to the storage of the multicast group. As mentioned previously, the pulling of the modification can also occur from a neighboring or another storage that is part of the multicast group if a particular storage has already obtained the update from the storage of the multicast initiator. Once each of the storage in the multicast group has pulled the modification and ensured that the data resident in the storage of the multicast group is identical to that of the storage of the multicast initiator, the method will move to operation 508 where operation will continue until another modification to the data at the multicast initiator is detected, or until a detect timer expires.

By way of example, a detect timer may be set based on a schedule which is designed to check the bitmaps to determine if a modification needs to be pulled. If the detect timer expires and the bitmaps do not indicate that a pull of an update is required, the method will then continue to wait until the timer expires once again. In one embodiment, the timer can be set to expire monthly, weekly, daily, hourly, at the expiration of several minutes, or continuously. If the detection occurs continuously, once the bitmap changes at a particular storage of the multicast group, the point of the modification will instantly occur in order to maintain the mirror image of the multicast initiator at the particular multicast group storage.

Figure 7:
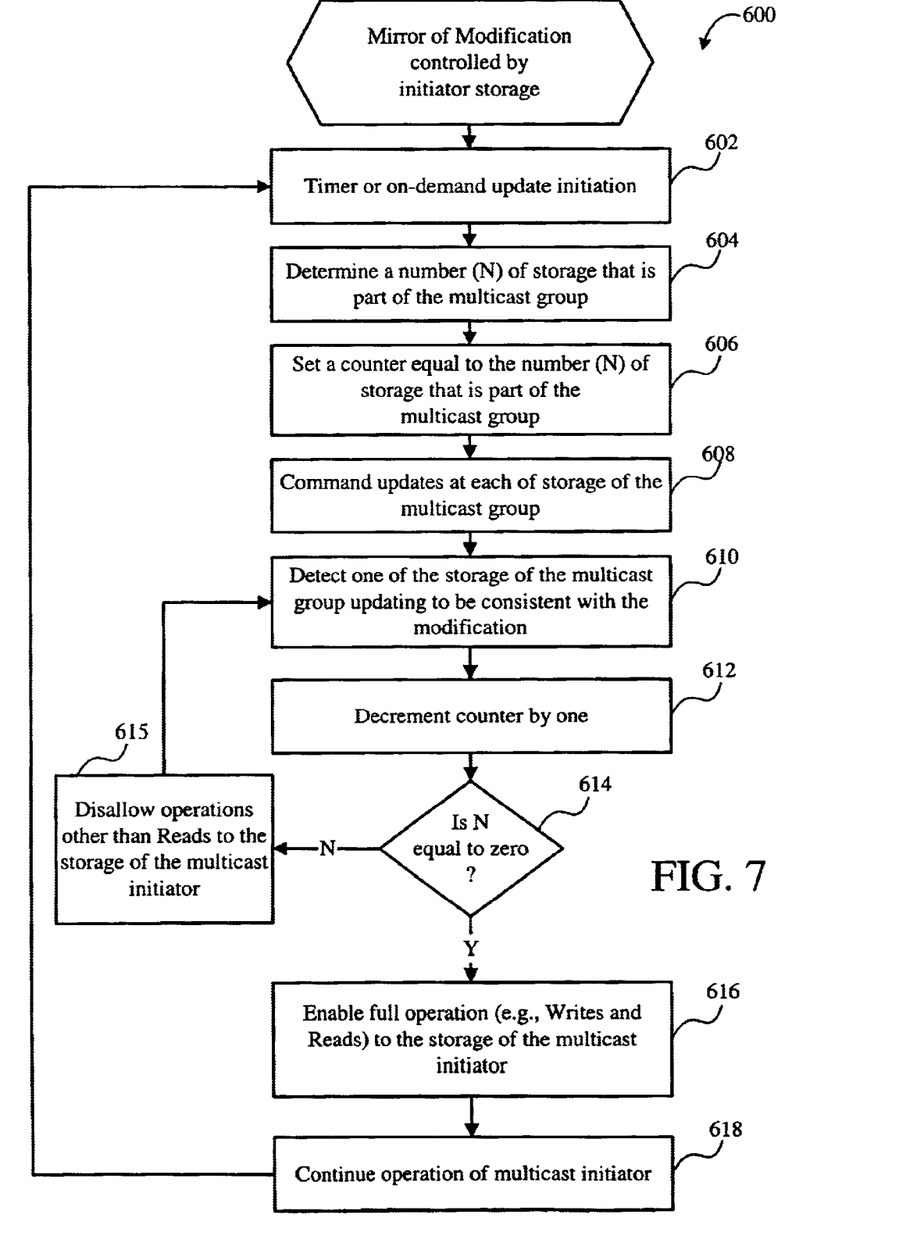
FIG. 7 illustrates a flowchart in which the mirror of the modification is controlled by the initiator storage, in accordance with one embodiment of the present invention.

FIG. 7 illustrates a flowchart 600 in which the mirror of the modification is controlled by the initiator storage. In this embodiment, the mirror of the modification that is controlled by the initiator storage can be initiated upon the expiration of a timer, or on demand as shown in block 602. In operation 604, a determination is made as to the number of storage that defines the multicast group of storage. For example, if the number of storage equals N, a counter is set equal to N in operation 606. At operation 608, a command is initiated to control the updating of each storage in the multicast group.

As each of the storage in the multicast group begins to update to remain consistent with the modification made at the multicast initiator, the method moves to operation 610 where at least one of the storage of the multicast group begins to update to be consistent with the modification. As each storage is update, the method moves to operation 612 where the counter is decremented by 1 for each of the storage being updated. For instance, if N is equal to 3, the decrementing by 1 would then cause N to be 2. In operation 614, it is determined if N is equal to zero. If capital N is not equal to zero, the method moves to operation 615 where operations other than reads to the storage of the multicast initiator are disallowed.

The method then moves to operation 610 where again, it is detected that one of the storage of the multicast group is initiating to be consistent with the modification. Again, operation 612 decrements N by 1 and operation 614 determines if N is equal to zero. At this point, N is equal to 1 and therefore, the method moves to operation 615 and 610 once again where the final storage associated with the multicast group is updated with the modification. A decrement by 1 in operation 612 will then bring the counter down to zero, which then moves to operation 616 which enables full operation of the multicast initiator storage and thus, allows writes and reads in the continued operation of the multicast initiator in operation 618. The method will then continue until the timer or an non-demand update is initiated in operation 602.

At that point, the determination again is made in operation 604 as to the number of storage N that is part of the multicast group. This determination is made because more or fewer storage may become part of the multicast group at any point. For instance, if a particular storage that is part of the multicast group were to fail, the number of storage that is part of the multicast group would change. In a like manner, if additional storage locations are added and are made part of the multicast group, the number N would also change. In accordance with this embodiment, the counter will therefore enforce that all of the storage that make up the multicast group are properly updated with any modification made to the storage associated with the multicast initiator before additional changes or modifications are made to the storage of the multicast initiator at operation 616.

It should be appreciated that the embodiments of the present invention are substantially more efficient than conventional mirroring solutions. As previously described with reference to the prior art, in conventional mirroring implementations, the various levels of a system must remain synchronous in regard to each access to the rotating media. This is true for each rotating media that makes up the mirror set. Because the logic of the multicast initiator need only remain synchronous with one rotating medium (e.g., the storage A), the process of mirroring data to N other storage will not introduce latencies. The task of mirroring the data is, on the other hand, is assigned independently to the logic of each storage of the multicast group of storage. Yet another advantage of the embodiments described herein is that each storage of the multicast group can be located virtually anywhere, so long as some communication nexus can be established. If any one of the storage of the multicast group were to be destroyed or damaged, for example, in a fire, a hurricane, an earthquake, etc., the data would still be protected by the other members of the multicast group.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for N-way mirroring of data, comprising:

selecting an initiator storage, the initiator storage having data that is to be protected;

selecting a group of storage, each storage in the group of storage being configured to obtain an initial copy of the data of the initiator storage that is to be protected;

detecting a modification occurrence in the data that is to be protected in the initiator storage, wherein the modification causes a setting of consistency bits at the initiator storage, the consistency bits at the initiator storage defining a type of modification made to the data of the initiator storage; and notifying each of the storage of the group of storage of the modification occurrence, the notifying being performed without transmission of a modification corresponding to the detected modification occurrence, the notifying causing a setting of consistency bits at each of the storage of the group of storage, the consistency bits at each of the storage of the group of storage defining the type of modification made to the data of the initiator storage;

wherein the notifying is configured to cause each of the storage of the group of storage to independently obtain the modification corresponding to the detected modification occurrence from the initiator storage without assistance from the initiator storage so as to maintain data consistency between the initiator storage and the group of storage.

2. A method for N-way mirroring of data, comprising:

selecting an initiator storage, the initiator storage having data that is to be protected;

selecting a group of storage, each storage in the group of storage being configured to obtain an initial copy of the data of the initiator storage that is to be protected;

detecting a modification in the data that is to be protected in the initiator storage, wherein the modification causes a setting of consistency bits in a consistency bitmap at the initiator storage, the consistency bits enabling the maintenance of consistency among instances of the data that is to be protected; and notifying each of the storage of the group of storage of the modification by causing a setting of consistency bits in a consistency bitmap at each of the storage of the group of storage, the consistency bits enabling the maintenance of consistency among instances of the data that is to be protected;

wherein the notifying is configured to cause each of the storage of the group of storage to independently obtain the modification in the data without assistance of the initiator storage so as to maintain data consistency between the initiator storage and the group of storage.

3. A method for N-way mirroring of data as recited in claim 2, wherein the consistency bits define a type of modification made to the data of the initiator storage.

4. A method for N-way mirroring of data as recited in claim 2, further comprising:

referring to the setting of consistency bits at each of the storage of the group of storage, the referring being performed independently by each storage of the group of storage without directed control of the initiator storage.

5. A method for N-way mirroring of data as recited in claim 4, further comprising:

each of the storage of the group of storage pulling the copy of the modification in response to detecting a need to update, the detecting being accomplished by referring to the settings of the consistency bits.

6. A method for N-way mirroring of data as recited in claim 5, wherein the pulling the copy of the modification can be from one of the initiator storage and particular ones of the group of storage.

7. A method for N-way mirroring of data as recited in claim 2, wherein the initiator storage is a multicast initiator and each of the group of storage is part of a multicast group.

8. A method for N-way mirroring of data as recited in claim 2, wherein when the modification is detected, the method further comprises:

preventing further modifications to the initiator storage;

ascertaining a number N, the number N being equal to a sum of each storage of the group of storage;

decrementing the number N each time one of the storage in the group of storage is updated with the copy of the modification;

enabling further modifications to the initiator storage once the number N is equal to zero, the number N being equal to zero being indicative of each of the storage of the group of storage having a consistent copy of the data of the initiator storage that is to be protected.

9. An N-way mirroring system, comprising:

an initiator storage, the initiator storage having data that is to be protected;

initiator logic, the initiator logic being configured to monitor changes to the data that is protected and to generate notifications of the changes;

a group of storage, at least some of the storage of the group of storage residing at different physical locations, yet each of the group of storage having a communication link to the initiator storage; and a group of storage logic, each storage logic being associated with each storage of the group of storage, each storage logic being configured to receive notifications of changes from the initiator logic and in response to certain notifications initiate a pulling of the changes made at the initiator storage, the pulling of the changes being made independently by each of the storage logic of each storage of the group of storage and without assistance of the initiator logic;

wherein the initiator logic and each storage logic are each in communication with a respective consistency bitmap, each of the respective consistency bitmaps having consistency bits to enable detection of changes in the data to be protected and initiate consistency mirroring operations.

10. An N-way mirroring system as recited in claim 9, wherein the initiator logic and each of the storage logic is the form of one of executable computer code, hardware, and firmware.

11. An N-way mirroring system as recited in claim 9, wherein each of the initiator storage and the group of storage is one of a data object, a hard disk, a physical volume, a logical volume, and an array of storage.

12. A method for N-way mirroring of data, comprising:

selecting an initiator storage, the initiator storage having data that is to be protected;

selecting a group of storage, each storage in the group of storage being configured to obtain an initial copy of the data of the initiator storage that is to be protected;

detecting a modification occurrence in the data that is to be protected in the initiator storage;

wherein when the modification is detected, the method includes:
preventing further modifications to the initiator storage;
ascertaining a number N, the number N being equal to a sum of each storage of the group of storage;
decrementing the number N each time one of the storage in the group of storage is updated with the copy of the modification;
enabling further modifications to the initiator storage once the number N is equal to zero, the number N being equal to zero being indicative of each of the storage of the group of storage having a consistent copy of the data of the initiator storage that is to be protected; and notifying each of the storage of the group of storage of the modification occurrence, the notifying being performed without transmission of a modification corresponding to the detected modification occurrence;

wherein the notifying is configured to cause each of the storage of the group of storage to independently obtain the modification corresponding to the detected modification occurrence from the initiator storage without assistance from the initiator storage so as to maintain data consistency between the initiator storage and the group of storage.

* * * * *